(12) United States Patent
Kimura

(10) Patent No.: US 9,932,899 B2
(45) Date of Patent: Apr. 3, 2018

(54) BEARING LUBRICATING STRUCTURE FOR GAS TURBINE ENGINE

(71) Applicant: HONDA MOTOR CO., LTD., Tokyo (JP)

(72) Inventor: Hidemi Kimura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 464 days.

(21) Appl. No.: 14/669,390

(22) Filed: Mar. 26, 2015

(65) Prior Publication Data
US 2015/0275760 A1  Oct. 1, 2015

(30) Foreign Application Priority Data
Mar. 28, 2014 (JP) .................................. 2014-067817

(51) Int. Cl.
*F02C 7/06* (2006.01)
*F01D 25/18* (2006.01)

(52) U.S. Cl.
CPC .............. *F02C 7/06* (2013.01); *F01D 25/18* (2013.01); *F05D 2240/50* (2013.01)

(58) Field of Classification Search
CPC . F02C 7/06; F01D 25/16; F01D 25/18; F01D 25/22; F01D 25/162; F05D 2240/50
See application file for complete search history.

(56) References Cited

U.S. PATENT DOCUMENTS

| 6,872,003 B2 * | 3/2005 | Dusserre-Telmon . F01D 25/164 384/99 |
| 7,574,854 B2 | 8/2009 | Moniz |
| 2004/0179935 A1 | 9/2004 | Maguire |

FOREIGN PATENT DOCUMENTS

| JP | 57-65495 A | 4/1982 |
| JP | 10-299416 | 11/1998 |
| JP | 2002-201901 A | 7/2002 |
| JP | 2004-270922 A | 9/2004 |
| JP | 2007-198374 A | 8/2007 |

OTHER PUBLICATIONS

Japanese Decision of Granting a Patent dated Aug. 30, 2017, 3 pages.

\* cited by examiner

*Primary Examiner* — Woody Lee, Jr.
*Assistant Examiner* — Maxime Adjagbe
(74) *Attorney, Agent, or Firm* — Rankin, Hill & Clark LLP

(57) ABSTRACT

When A denotes a required oil lower limit amount for one bearing near an oil supply source, and B and C respectively denote a required oil lower limit amount and a safety surplus oil amount for the other bearing away from the source, an amount of oil equal to A+B+C is supplied from the source and a hole diameter and the number of first oil holes are set such that an amount of oil to be supplied to the one bearing is equal to the amount A. Thus, the oil with the amount A can be securely supplied to the one bearing. Also, oil with the sum of the amounts B and C is supplied to the other bearing so that the oil with the amount B can be securely supplied to the other bearing which tends to receive oil insufficiently because of its remoteness from the source.

2 Claims, 5 Drawing Sheets

BEARING LUBRICATING STRUCTURE FOR GAS TURBINE ENGINE

CROSS REFERENCE TO RELATED APPLICATIONS

The present application claims priority under 35 U.S.C. § 119 to Japanese Patent Application No. 2014-67817 filed Mar. 28, 2014 the entire contents of which are hereby incorporated by reference.

BACKGROUND OF THE INVENTION

Field of the Invention

The present invention relates to a bearing lubricating structure for a gas turbine engine, the engine including a low-pressure system shaft, and a high-pressure system shaft fitted to an outer periphery of the low-pressure system shaft in a relatively rotatable manner, in which the low-pressure system shaft is supported by a casing via a first bearing, the high-pressure system shaft is supported by the low-pressure system shaft via a second bearing, and oil is supplied to the first bearing and the second bearing from an oil supply source.

Description of the Related Art

A twin-spool gas turbine engine, in which a high-pressure system shaft is disposed on an outer periphery of a low-pressure system shaft in a relatively rotatable manner, includes: a bearing with which the low-pressure system shaft and the high-pressure system shaft are supported by a casing; and a differential bearing disposed between the low-pressure system shaft and the high-pressure system shaft. The low-pressure system shaft and the high-pressure system shaft are designed to rotate reversely to each other for the purpose of enhancing aerodynamic performances of a compressor and a turbine. Thus, relative rotation speed between an inner race and an outer race becomes large in the differential bearing disposed between the low-pressure system shaft and the high-pressure system shaft so that an amount of oil needed to lubricate the differential bearing increases. Against this background, Japanese Patent Application Laid-open No. 10-299416 has made publicly known a gas turbine engine in which oil injected from an oil jet is supplied to the differential bearing via oil passages, oil reservoirs and oil holes.

However, the foregoing conventional gas turbine engine is likely to be unable to supply a sufficient amount of oil to the differential bearing which needs a larger amount of oil because the bearing with which the low-pressure system shaft is supported by the casing is disposed in a supply passage of the oil from the oil jet to the differential bearing so that the bearing consumes the oil. Supplying of the sufficient amount of oil to the differential bearing may be achieved by increasing capacity of an oil pump. However, the increase in the capacity of the oil pump raises a problem of: making an oil tank and the oil pump bulky in size; and accordingly increasing weight and cost of the gas turbine engine.

SUMMARY OF THE INVENTION

The present invention has been made with the foregoing situation taken into consideration. An object of the present invention is to enable a necessary and sufficient amount of oil to be supplied to multiple bearings for supporting a low-pressure system shaft and a high-pressure system shaft in a gas turbine engine.

In order to achieve the object, according to a first aspect of the present invention, there is provided a bearing lubricating structure for a gas turbine engine, the engine including a low-pressure system shaft, and a high-pressure system shaft fitted to an outer periphery of the low-pressure system shaft in a relatively rotatable manner, in which the low-pressure system shaft is supported by a casing via a first bearing, the high-pressure system shaft is supported by the low-pressure system shaft via a second bearing, and oil is supplied to the first bearing and the second bearing from an oil supply source, the structure comprising: a first oil passage for supplying the oil to one bearing of the first and second bearings from the oil supply source; a first oil reservoir connected to a downstream portion of the first oil passage, and formed inside the one bearing in a radial direction; first oil holes extending outward in the radial direction from the first oil reservoir, and communicating with the one bearing; a second oil passage for supplying the oil to the other bearing of the first and second bearings from the first oil reservoir; a second oil reservoir connected to a downstream portion of the second oil passage, and formed inside the other bearing in the radial direction; and second oil holes extending outward in the radial direction from the second oil reservoir, and communicating with the other bearing, wherein when A denotes a required oil lower limit amount for the one bearing, as well as B and C respectively denote a required oil lower limit amount and a safety surplus oil amount for the other bearing, an amount of oil equal to A+B+C is supplied from the oil supply source, and a hole diameter and the number of the first oil holes are set such that an amount of oil to be supplied to the one bearing is equal to the required oil lower limit amount A.

According to the first aspect, the gas turbine engine includes the low-pressure system shaft and the high-pressure system shaft which are respectively disposed inward and outward in the radial direction, and which rotate relative to each other. The low-pressure system shaft is supported by the casing via the first bearing, and the high-pressure system shaft is supported by the low-pressure system shaft via the second bearing. The oil is supplied to the first bearing and the second bearing from the oil supply source. Part of the oil from the oil supply source is supplied to the one bearing of the first and second bearings via the first oil passage, the first oil reservoir and the first oil holes. The rest of the oil is supplied to the other bearing of the first and second bearings from the first oil reservoir via the second oil passage, the second oil reservoir and the second oil holes.

When A denotes the required oil lower limit amount for the one bearing, as well as B and C respectively denote the required oil lower limit amount and the safety surplus oil amount for the other bearing, the amount of oil equal to A+B+C is supplied from the oil supply source, and the hole diameter and the number of the first oil holes are set such that the amount of oil to be supplied to the one bearing is equal to the required oil lower limit amount A. For this reason, not only can the oil with the required oil lower limit amount A be securely supplied to the one bearing. But also, the oil with the sum of the required oil lower limit amount B and the safety surplus oil amount C can be supplied to the other bearing. Thereby, the oil with the required oil lower limit amount B can be securely supplied to the other bearing, which tends to receive an insufficient amount of oil because of its remoteness from the oil supply source.

According to a second aspect of the present invention, in addition to the first aspect, the low-pressure system shaft and the high-pressure system shaft rotate reversely to each other, and the other bearing is the second bearing.

According to the second aspect, the low-pressure system shaft and the high-pressure system shaft rotate reversely to each other. This increases load of the second bearing so as to increase an amount of oil needed for the second bearing. However, the oil with the sum of the required oil lower limit amount B and the safety surplus oil amount C is supplied to the second bearing which tends to receive an insufficient amount of oil because of its remoteness from the oil supply source. Thereby, insufficient lubrication of the second bearing can be securely prevented.

It should be noted that: an inner casing 12 of an embodiment corresponds to the casing of the present invention; a rear first bearing 14 of the embodiment corresponds to the one bearing or the first bearing of the present invention; a rear second bearing 18 of the embodiment corresponds to the other bearing or the second bearing of the present invention; and an oil jet 55 of the embodiment corresponds to the oil supply source of the present invention.

The above and other objects, characteristics and advantages of the present invention will be clear from detailed descriptions of the preferred embodiment which will be provided below while referring to the attached drawings.

DESCRIPTION OF THE PREFERRED EMBODIMENT

Descriptions will be hereinbelow provided for an embodiment of the present invention on the basis of FIGS. 1 to 5.

Figure 1:
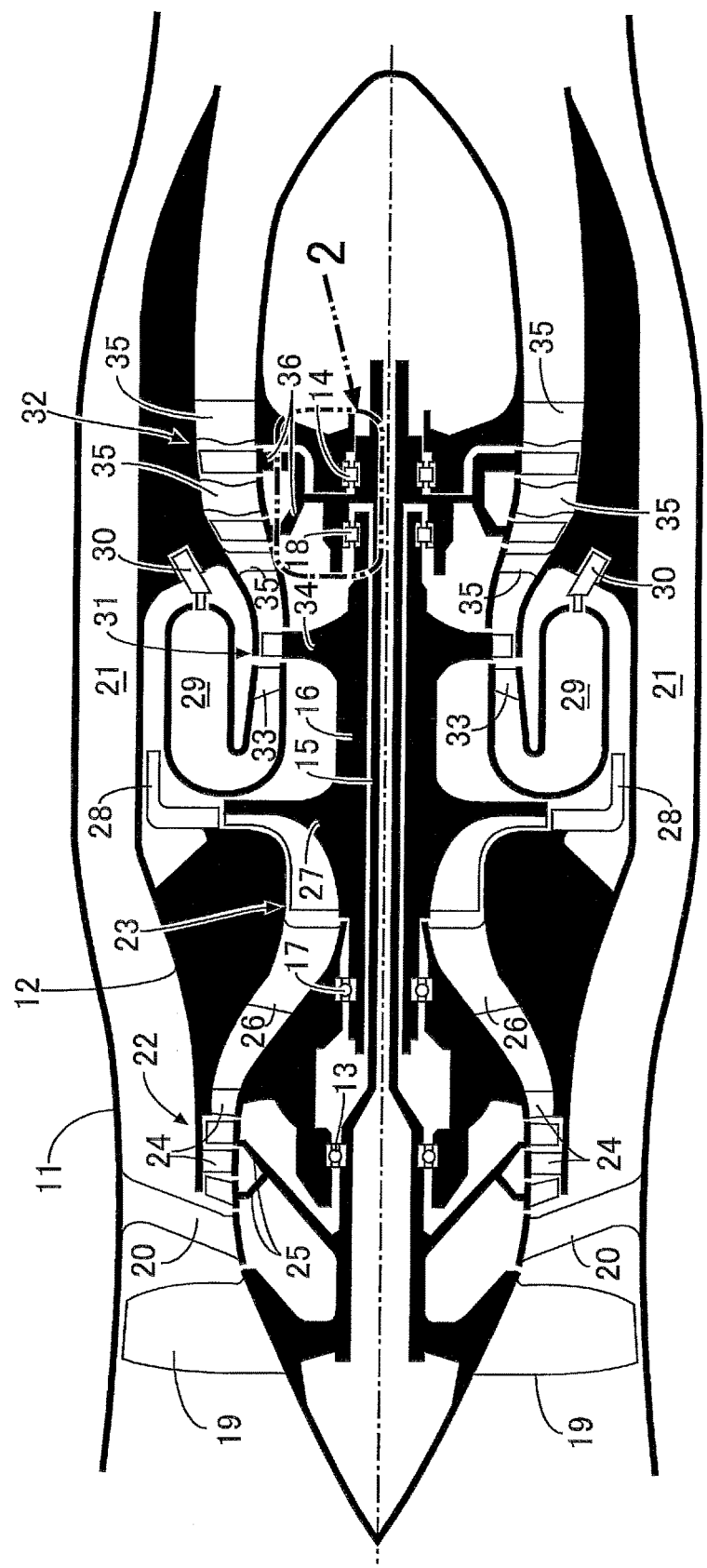
FIG. 1 is a view showing an overall structure of a twin-spool turbofan engine.

As shown in FIG. 1, a twin-spool turbofan engine for an aircraft to which the present invention is applied includes an outer casing 11 and an inner casing 12. Front and rear portions of a low-pressure system shaft 15 are rotatably supported by an inside of the inner casing 12 via front and rear first bearings 13, 14, respectively. A tubular high-pressure system shaft 16 is fitted to an outer periphery of an axial-direction intermediate portion of the low-pressure system shaft 15 in a relatively rotatable manner. A front portion of the high-pressure system shaft 16 is rotatably supported by the inner casing 12 via a front second bearing 17, while a rear portion of the high-pressure system shaft 16 is supported by the low-pressure system shaft 15 in a relatively rotatable manner via a rear second bearing 18.

A front fan 19 having blade ends which face an inner surface of the outer casing 11 is fixed to a front end of the low-pressure system shaft 15. Part of air sucked by the front fan 19 passes through stator vanes 20 disposed between the outer casing 11 and the inner casing 12. Part of the air having passed through the stator vanes 20 thereafter passes through an annular bypass duct 21 formed between the outer casing 11 and the inner casing 12, and is jetted rearward. Other part of the air is supplied to an axial low-pressure compressor 22 and a centrifugal high-pressure compressor 23 which are disposed inside the inner casing 12.

The low-pressure compressor 22 includes: stator vanes 24 fixed to the inside of the inner casing 12; and a low-pressure compressor wheel 25 having compressor blades on its outer periphery, and fixed to the low-pressure system shaft 15. The high-pressure compressor 23 includes stator vanes 26 fixed to the inside of the inner casing 12; and a high-pressure compressor wheel 27 having compressor blades on its outer periphery, and fixed to the high-pressure system shaft 16.

A reverse-flow combustion chamber 29 is disposed in a rear of a diffuser 28 connected to an outer periphery of the high-pressure compressor wheel 27. Fuel injection nozzles 30 inject fuel into the reverse-flow combustion chamber 29. The fuel and the air are mixed together and combusted inside the reverse-flow combustion chamber 29. The generated combustion gas is supplied to a high-pressure turbine 31 and a low-pressure turbine 32.

The high-pressure turbine 31 includes: nozzle guide vanes 33 fixed to the inside of the inner casing 12; and a high-pressure turbine wheel 34 having turbine blades on its outer periphery, and fixed to the high-pressure system shaft 16. The low-pressure turbine 32 includes: nozzle guide vanes 35 fixed to the inside of the inner casing 12; and low-pressure turbine wheels 36 each having turbine blades on its outer periphery, and fixed to the low-pressure system shaft 15.

For this reason, once the high-pressure system shaft 16 is driven by a starter motor (not illustrated), air sucked by the high-pressure compressor wheel 27 is supplied to the reverse-flow combustion chamber 29, and mixed with the fuel to be combusted. The generated combustion gas drives the high-pressure turbine wheel 34 and the low-pressure turbine wheels 36. As a result, the low-pressure system shaft 15 and the high-pressure system shaft 16 rotate. Accordingly, the front fan 19, the low-pressure compressor wheel 25 and the high-pressure compressor wheel 27 compress air, and supply the compressed air to the reverse-flow combustion chamber 29. Thereby, even after operation of the starter motor is stopped, the turbofan engine continues its operation.

While the turbofan engine is in operation, part of air sucked by the front fan 19 passes through the bypass duct 21, and is jetted rearward so as to, particularly during low-speed flight, generate main thrust. The remaining part of the air sucked by the front fan 19 is supplied to the reverse-flow combustion chamber 29, and is mixed with the fuel to be combusted. The combusted gas drives the low-pressure system shaft 15 and the high-pressure system shaft 16, and is thereafter jetted rearward, generating thrust.

Next, descriptions will be provided for an oil supply passage to the rear first bearing 14 and the rear second bearing 18 on the basis of FIGS. 2 to 5.

A sleeve 41 for supporting the two low-pressure turbine wheels 36 is fitted to an outer periphery of the low-pressure system shaft 15 via a spline 42, and is fastened to the low-pressure system shaft 15 with an oil guide member 43 which is screwed onto an outer periphery of an axial end of the low-pressure system shaft 15. The rear first bearing 14 includes: an inner race 45 fitted to an outer periphery of the sleeve 41; an outer race 46 fitted to an inner periphery of a bearing holding member 44 of the inner casing 12; and multiple rollers 47 disposed between the inner race 45 and the outer race 46. The bearing holding member 44 and the outer race 46 are fastened to the inner casing 12 with bolts 48. The inner race 45 is fastened to the sleeve 41 with a nut 49 which is screwed onto an outer periphery of an end portion of the sleeve 41.

The rear second bearing 18 includes: an inner race 52 fitted to an outer periphery of the high-pressure system shaft 16 which is fitted to the outer periphery of the sleeve 41 in a relatively rotatable manner, and fastened to the high-pressure system shaft 16 with a nut 50; an outer race 53 fixed to the sleeve 41 with bolts 51; and multiple rollers 54 disposed between the inner race 52 and the outer race 53.

The rear first bearing 14 is disposed between the sleeve 41 fitted to the outer periphery of the low-pressure system shaft 15 and the bearing holding member 44 of the inner casing 12, as well as the relative number of rotation between the inner race 45 and the outer race 46 is small. For these reasons, load of the rear first bearing 14 is relatively small. On the other hand, the rear second bearing 18 is disposed between the sleeve 41 fitted to the outer periphery of the low-pressure system shaft 15 and the high-pressure system shaft 16, as well as the relative number of rotation between the inner race 52 and the outer race 53 is large. For these reasons, load of the rear second bearing 18 is relatively large.

Figure 2:
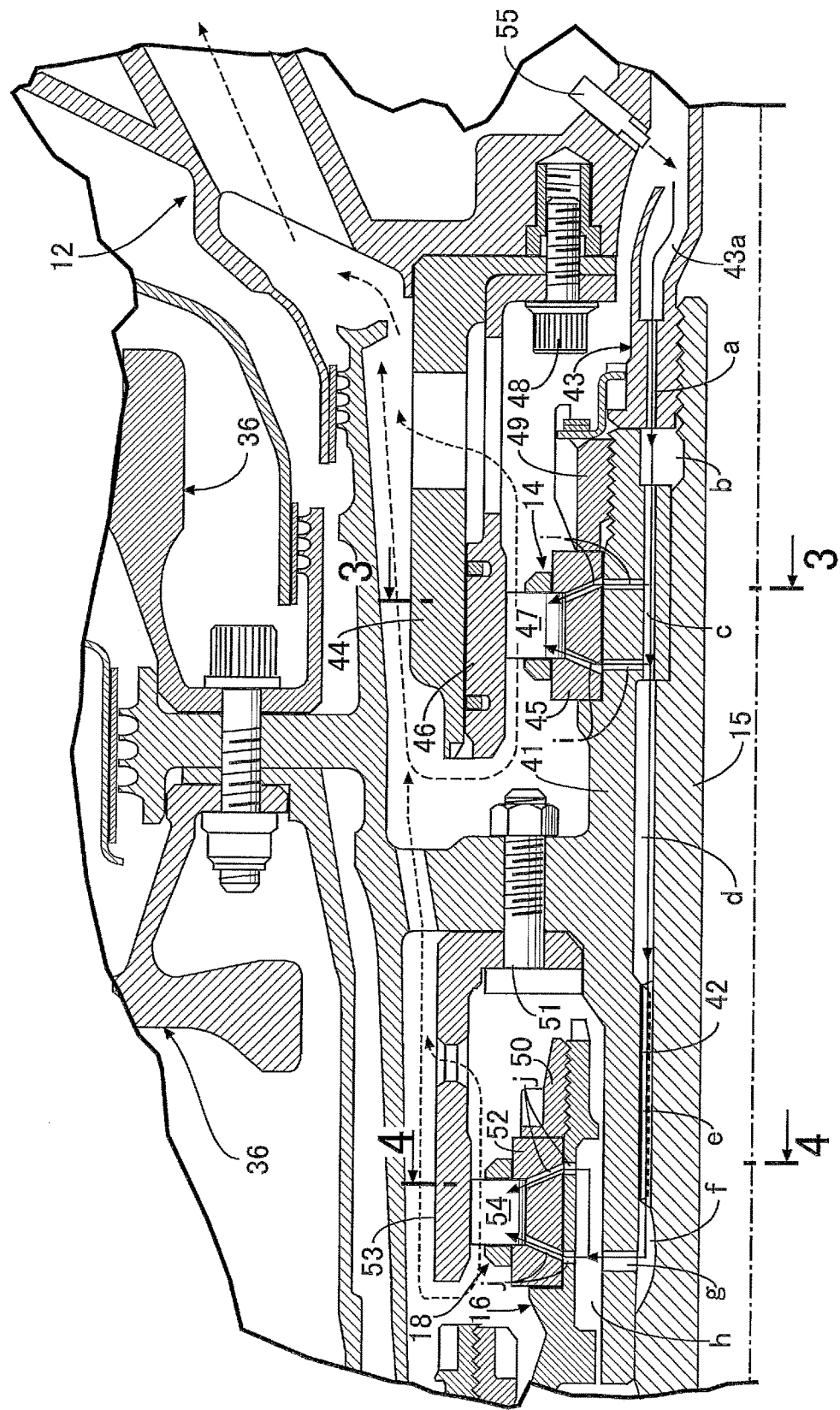
FIG. 2 is an enlarged view of a section 2 in FIG. 1.
Figure 5:
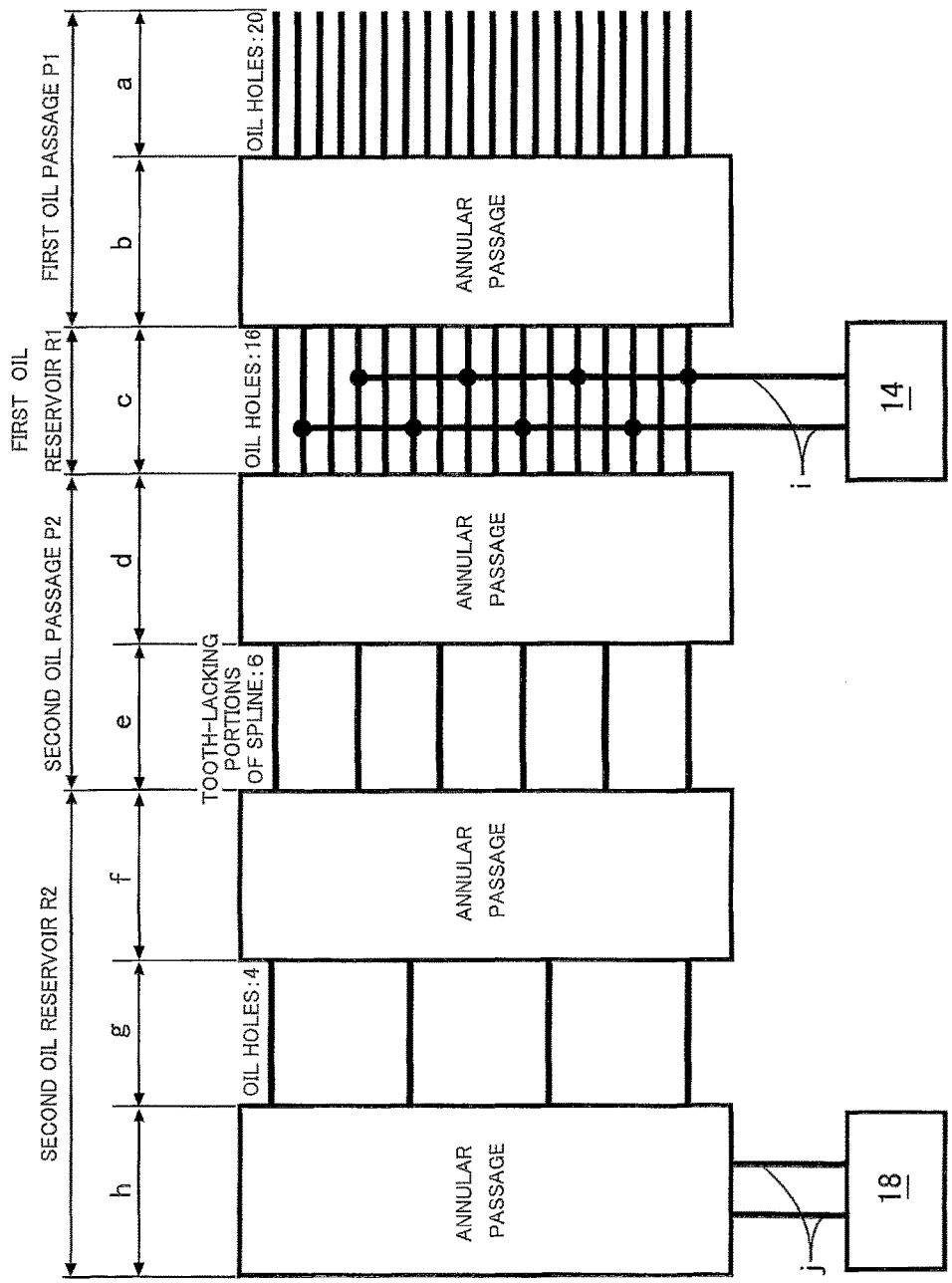
FIG. 5 is a schematic diagram of an oil supply passage.

As shown in FIGS. 2 and 5, an oil introduction passage 43a is formed in the oil guide member 43 to which an oil jet 55 provided to the inner casing 12 is directed. A first oil passage P1 communicates with a downstream portion of the oil introduction passage 43a. The first oil passage P1 is formed from: 20 oil holes disposed inside the oil guide member 43, arranged at equal intervals in an peripheral direction, and penetrating through the oil guide member 43 in an axial direction; and an annular passage b formed between an end surface of the oil guide member 43 and an end surface of the sleeve 41. A first oil reservoir R1 communicating with a downstream portion of the first oil passage P1 is formed from 16 oil holes c disposed inside the sleeve 41, arranged at equal intervals in an peripheral direction, and penetrating through the sleeve 41 in an axial direction. Furthermore, the first oil reservoir R1 is connected to the rollers 47 of the rear first bearing 14 via 8 first oil holes i in total which extend outward in a radial direction from the first oil reservoir R1.

Figure 3:
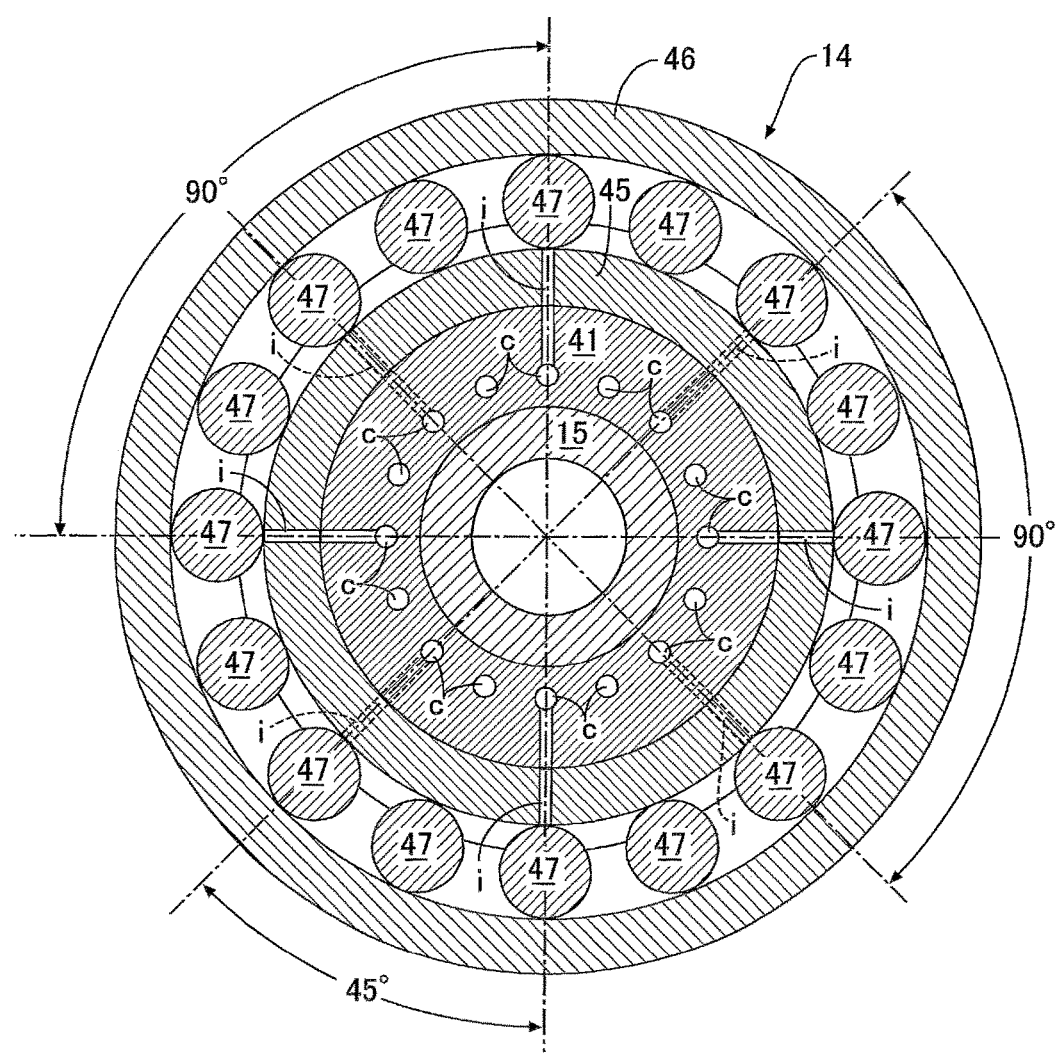
FIG. 3 is a sectional view taken along a 3-3 line in FIG. 2.

As shown in FIG. 3, the first oil holes i include: 4 first oil holes i extending from 4 oil holes c which are among the 16 oil holes c formed inside the sleeve 41 and are disposed at 90-degree intervals, and communicating with the rollers 47 while penetrating through the sleeve 41 and the inner race 45 of the rear first bearing 14 in the radial direction; and other 4 first oil holes i extending from other four oil holes c which are among the 16 oil holes c and are disposed at 90-degree intervals, and communicating with the rollers 47 while penetrating through the sleeve 41 and the inner race 45 of the rear first bearing 14 in the radial direction. The former 4 first oil holes i and the latter 4 first oil holes i are separated away from one another in the axial direction, and are displaced from one another by 45 degrees in the peripheral direction.

Returning to FIGS. 2 and 5, a second oil passage P2 communicating with a downstream portion of the first oil reservoir R1 is formed from: an annular passage d formed between the outer periphery of the low-pressure system shaft 15 and an inner periphery of the sleeve 41; 6 tooth-lacking portions e of the spline 42 with which to connect the low-pressure system shaft 15 and the sleeve 41 together. A second oil reservoir R2 communicating with a downstream portion of the second oil passage P2 is formed from: an annular passage f formed between the outer periphery of the low-pressure system shaft 15 and the inner periphery of the sleeve 41; 4 oil holes g penetrating through the sleeve 41 in the radial direction; and an annular passage h formed between the outer periphery of the sleeve 41 and an inner periphery of the high-pressure system shaft 16. Furthermore, the annular passage h of the second oil reservoir R2 is connected to the rollers 54 of the rear second bearing 18 via 8 second oil holes j in total which extend outward in the radial direction from the annular passage h.

Figure 4:
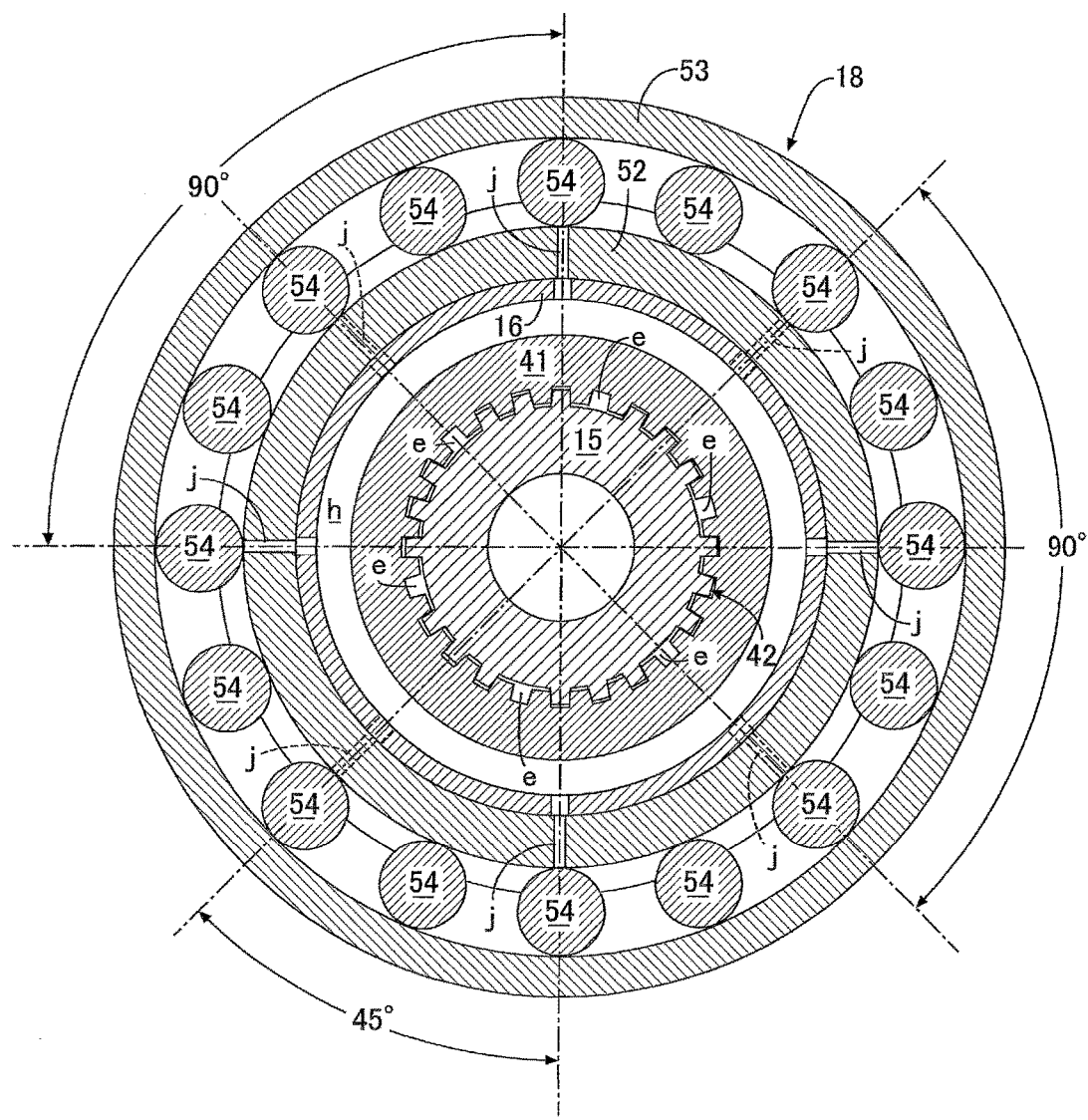
FIG. 4 is a sectional view taken along a 4-4 line in FIG. 2.

As shown in FIG. 4, the second oil holes j include: 4 second oil holes j disposed at 90-degree intervals, and communicating with the rollers 54 while penetrating through the high-pressure system shaft 16 and the inner race 52 of the rear second bearing 18; and the other 4 second oil holes j disposed at 90-degree intervals, and communicating with the rollers 54 while penetrating through the high-pressure system shaft 16 and the inner race 52 of the rear second bearing 18. The former 4 second oil holes j and the latter 4 second oil holes j are separated away from one another in the axial direction, and are displaced from one another by 45 degrees in the peripheral direction.

Next, descriptions will be provided for an operation of the embodiment of the present invention including the foregoing configuration.

Oil supplied from the oil jet 55 flows from the oil introduction passage 43a of the oil guide member 43 through the first oil passage P1 formed from the oil holes a and the annular passage b so as to be supplied to the first oil reservoir R1 formed from the oil holes c, and is supplied to the rear first bearing 14 through the 8 first oil holes i branching outward in the radial direction from the first oil reservoir R1, thereby lubricating surfaces of the rollers 47 which are in rolling contact with the inner race 45 and the outer race 46.

The rest of the oil in the other 8 oil holes c in the first oil reservoir R1 flows further through the second oil passage P2 formed from the annular passage d and the tooth lacking portions e of the spline 42 so as to be supplied to the second oil reservoir R2 formed from the annular passage f, the oil holes g and the annular passage h, and is supplied to the rear second bearing 18 through the 8 second oil holes j branching outward in the radial direction from the second oil reservoir R2, thereby lubricating surfaces of the rollers 54 which are in rolling contact with the inner race 52 and the outer race 53.

After lubricating the rear first bearing 14 and the rear second bearing 18, the oil is returned to an oil tank while flowing through passages indicated with arrows with broken lines in FIG. 2.

Meanwhile, the rear first bearing 14 not only requires a smaller amount of oil, since the rear first bearing 14 is disposed between the low-pressure system shaft 15 and the inner casing 12 and the relative number of rotation between the low-pressure system shaft 15 and the inner casing 12 is small. But also, the rear first bearing 14 is easily supplied with the oil since the rear first bearing 14 is located near the oil jet 55. On the other hand, the rear second bearing 18 not only requires a larger amount of oil, since the rear second bearing 18 is disposed between the low-pressure system shaft 15 and the high-pressure system shaft 16 and the relative number of rotation between the low-pressure system shaft 15 and the high-pressure system shaft 16 is large. But also, the rear second bearing 18 is not easily supplied with the oil since the rear second bearing 18 is located away from the oil jet 55.

In the embodiment, a total amount of oil to be supplied from the oil jet 55 is set at A+B+C, where: A denotes a required oil lower limit amount representing a minimum amount of oil needed to sufficiently lubricate the rear first bearing 14; B denotes a required oil lower limit amount representing a minimum amount of oil needed to sufficiently lubricate the rear second bearing 18; and C denotes a safety surplus oil amount representing a surplus amount of oil to be supplied to the rear second bearing 18 for the safety purpose.

In addition, a hole diameter and the number of the first oil holes i communicating with the rear first bearing 14 are set such that an amount of oil to be supplied to the rear first bearing 14 is equal to the required oil lower limit amount A in the amount A+B+C of oil to be supplied from the oil jet 55. For example, although the number of the first oil holes i is 8 in the embodiment, the hole diameter and the number of the first oil holes i are increased when the oil with the required oil lower limit amount A cannot be supplied to the rear first bearing 14, or are decreased when the amount of oil to be supplied to the rear first bearing 14 exceeds the required oil lower limit amount A.

When the oil with the required oil lower limit amount A is thus supplied to the rear first bearing 14, oil with the sum of the required oil lower limit amount B and the safety surplus oil amount C is automatically supplied to the rear second bearing 18. Since an oil supply passage from the oil jet 55 to the rear second bearing 18 is long, there may be a case where part of the oil leaks somewhere in the oil supply passage, and there may be a case where the amount of oil supplied to the rear first bearing 14 more or less differs from the required oil lower limit amount A. Since, however, the safety surplus oil amount C is added as an extra in anticipation of such cases, only adjustments to the hole diameter and the number of the first oil holes i, without needlessly increasing the amount of oil to be supplied from the oil jet 55, makes it possible to supply a necessary and sufficient amount of oil to the rear second bearing 18 which is under severe lubricating conditions, and accordingly to preclude occurrence of insufficient lubrication.

The foregoing descriptions have been provided for the embodiment of the present invention. Various design changes, however, can be made to the present invention within the scope not departing from the gist of the present invention.

In the embodiment, for example, the oil from the oil jet 55 is supplied firstly to the rear first bearing 14, and more oil than needed for the rear first bearing 14 is supplied to the rear second bearing 18. However, the oil supply sequence may be reversed.

What is claimed is:

1. A bearing lubricating structure for a gas turbine engine, the engine including a low-pressure system shaft, and a high-pressure system shaft fitted to an outer periphery of the low-pressure system shaft in a relatively rotatable manner, in which the low-pressure system shaft is supported by a casing via a first bearing, the high-pressure system shaft is supported by the low-pressure system shaft via a second bearing, and oil is supplied to the first bearing and the second bearing from an oil supply source, the structure comprising:
an oil supply source including an oil jet for supplying oil;
a first oil passage for supplying the oil to one bearing of the first and second bearings from the oil jet of the oil supply source;
a first oil reservoir connected to a downstream portion of the first oil passage, and formed inside the one bearing in a radial direction;
first oil holes extending outward in the radial direction from the first oil reservoir, and communicating with the one bearing;
a second oil passage for supplying the oil to the other bearing of the first and second bearings from the first oil reservoir;
a second oil reservoir connected to a downstream portion of the second oil passage, and formed inside the other bearing in the radial direction; and
second oil holes extending outward in the radial direction from the second oil reservoir, and communicating with the other bearing,
wherein
A denotes a required oil lower limit amount for the one bearing, B denotes a required oil lower limit amount for the other bearing, and C denotes a safety surplus oil amount for the other bearing, the required oil lower limit amount for the one bearing A being a predetermined minimum amount of oil needed to lubricate the one bearing, the required oil lower limit amount for the other bearing B being a predetermined minimum amount of oil needed to lubricate the other bearing, and the safety surplus oil amount for the other bearing C being a predetermined surplus amount of oil to be supplied to the other bearing in addition to the required oil lower limit amount for the other bearing B,
the oil jet of the oil supply source supplies an amount of oil equal to A+B+C, and
a hole diameter and a number of the first oil holes are set such that an amount of oil to be supplied to the one bearing is equal to the required oil lower limit amount for the one bearing A.

2. The bearing lubricating structure for a gas turbine engine according to claim 1, wherein
the low-pressure system shaft and the high-pressure system shaft rotate reversely to each other, and
the other bearing is the second bearing.

* * * * *